US006785743B1

(12) United States Patent
Sun et al.

(10) Patent No.: US 6,785,743 B1
(45) Date of Patent: Aug. 31, 2004

(54) TEMPLATE DATA TRANSFER COPROCESSOR

(75) Inventors: Weiyun Sun, Seattle, WA (US); Donglok Kim, Seattle, WA (US); Yongmin Kim, Seattle, WA (US)

(73) Assignee: University of Washington, Seattle, WA (US)

(*) Notice: Subject to any disclaimer, the term of this patent is extended or adjusted under 35 U.S.C. 154(b) by 0 days.

(21) Appl. No.: 09/533,047

(22) Filed: Mar. 22, 2000

(51) Int. Cl.[7] .......................... G06F 9/34; G06F 12/10; G06F 13/28
(52) U.S. Cl. ................... 710/4; 710/3; 710/22; 710/26; 710/27; 710/305; 710/308; 711/200; 711/201; 711/202; 711/220; 712/32; 712/33; 712/34; 712/36
(58) Field of Search ..................... 710/26, 3, 4, 15, 710/16, 22–24, 27, 305, 308; 711/1, 2, 200, 201, 202, 211, 220; 712/1, 32–34, 36, 38, 208, 212

(56) References Cited

U.S. PATENT DOCUMENTS

| | | | | |
|---|---|---|---|---|
| 4,959,770 A | * | 9/1990 | Kondo et al. ............... 711/203 |
| 5,077,664 A | * | 12/1991 | Taniai et al. .................. 710/22 |
| 5,291,582 A | * | 3/1994 | Drako et al. .................. 710/26 |
| 5,440,687 A | * | 8/1995 | Coleman et al. ............. 709/236 |
| 5,467,459 A | * | 11/1995 | Alexander et al. .......... 711/153 |
| 5,471,638 A | * | 11/1995 | Keeley ......................... 710/7 |
| 5,481,756 A | * | 1/1996 | Kanno ......................... 710/22 |
| 5,590,302 A | * | 12/1996 | Tanaka ........................ 711/206 |
| 5,634,099 A | * | 5/1997 | Andrews et al. ............ 709/212 |
| 5,890,012 A | * | 3/1999 | Poisner ........................ 710/22 |
| 5,901,291 A | * | 5/1999 | Feeney et al. ............... 709/253 |
| 5,944,800 A | * | 8/1999 | Mattheis et al. .............. 710/23 |
| 6,070,194 A | * | 5/2000 | Yu et al. ...................... 709/229 |
| 6,081,851 A | * | 6/2000 | Futral et al. .................. 710/23 |
| 6,108,722 A | * | 8/2000 | Troeller et al. ............... 710/26 |
| 6,219,725 B1 | * | 4/2001 | Diehl et al. ................... 710/26 |
| 6,260,081 B1 | * | 7/2001 | Magro et al. ................ 710/22 |
| 6,314,507 B1 | * | 11/2001 | Doyle ......................... 711/220 |
| 6,330,644 B1 | * | 12/2001 | Yamashita et al. .......... 711/147 |
| 6,370,601 B1 | * | 4/2002 | Baxter ......................... 710/65 |
| 6,421,744 B1 | * | 7/2002 | Morrison et al. ............. 710/22 |
| 2002/0032846 A1 | * | 3/2002 | Doyle et al. ................. 711/202 |

OTHER PUBLICATIONS

Stotland et al., "Image Computing Library for a Next–Generation VLIW Multimedia Procesor;" SPIE vol. 3655; Part of IS&T/SPIE Conference on MEdia Processors 1999.
McKee et al.; "Smarter Memory: Improving Bandwidth for Streamed References;" IEEE Computer, vol. 31, No. 7, 1998.
Basoglu et al., High–Performance Image Computing with Modern Microprocessors, International Journal of Imaging Systems and Technology, vol. 9, 1998.
Rathman et al.; "Processing the New World of Interactive Media," IEEE Signal Processing Magazine, Mar. 1998.

* cited by examiner

Primary Examiner—Jeffrey Gaffin
Assistant Examiner—Tanh Q Nguyen
(74) Attorney, Agent, or Firm—Steven P. Koda (57) ABSTRACT

The template data transfer coprocessor (TDTP) offloads block data transfer operations from a mediaprocessor. A uni-block template, program-guided template, an indirect template and queue-based template are described. The TDTP includes a template interpreter that employs an event-driven control mechanism to set up a template and compute block information and block information for each template. The programming involved in defining block data transfers for video and image processing algorithms is substantially reduced by the use of these templates.

27 Claims, 4 Drawing Sheets

| | |
|---|---|
| | uni-block type |
| 38 | source address<br>source width<br>source height<br>source pitch |
| | source access mode |
| 40 | destination address<br>destination width<br>destination height<br>destination pitch |
| | destination access mode — 44 |
| 42 | 1D/2D | block width<br>block height — 46 |
| 48 | overlap mode |
| 50 | padding mode | wrapping mode — 52 |
| 54 | horizontal overlap |
| 56 | vertical overlap |

Fig. 3 padding area    overlap area

Fig. 4 right-side wrap    downward wrap    Diagonal wrap

TEMPLATE DATA TRANSFER COPROCESSOR

BACKGROUND OF THE INVENTION

This invention relates to data flow management for processors implementing on-chip parallelism, and more particularly to a coprocessor for managing data transfers to enable efficient performance of a processor exhibiting on-chip parallelism.

A "mediaprocessor" as used herein refers to a processor which exhibits on-chip parallelism for processing video or image data. Efficient data flow management is essential for achieving high performance in mediaprocessors. However, current mediaprocessors provide a low-level data transfer interface to application programmers, which not only makes data flow programming difficult, but also makes the source code lengthy and hard to maintain.

Modern microprocessors typically run at sub-GHz clock frequencies with wide datapath. This requires a high data access rate to the memory. However, accessing the off-chip memory involves a long latency, resulting in a limited overall memory bandwidth. Therefore, fast on-chip memory is used to cache those frequently-used data and to reduce the external memory access penalty. In addition, various data prefetch techniques have been developed to reduce the effective access latency, i.e., make the data available in on-chip memory before the CPU actually uses them.

Demanding imaging and video applications with a large amount of raw data are the main target of mediaprocessors. Typical image and video processing algorithms have regular data access patterns. Thus, a program can fetch in advance a block of data that is to be used soon. However, the programming required by conventional mediaprocessors to implement such a load is very limited. Most mediaprocessors require the programmer to partition the processing task and determine the sizes and addresses of the data blocks used for each partition in order to perform a block transfer. Since images and video frames can have varying sizes, the programmer must use irregular partitions and extra control flows to generalize the code, leading to lengthy programs. Further, in some algorithms additional tasks need to be performed such as padding. These are performed through added program instructions, thereby decreasing the efficiency of the data processing task. In many algorithms where the block-based data flow programming is used, it is necessary to explicitly fetch the boundary pixels in addition to the bulk data. Handling such irregular data flows in the program tends to decrease the programmer's overall productivity and also make the source code harder to upgrade and maintain. Moreover, the degree of concurrency between computation and data flow is diminished. Accordingly, there is a need for a more efficient and versatile manner of performing block data transfers.

A special concern to mediaprocessors with wide a datapath is the overhead of packing multiple small precision operands from different memory locations to a wide word. This is implemented conventionally by explicitly executing instructions in the mediaprocessors, thus consuming valuable CPU cycles and lowering overall performance. Accordingly, there is a need for a more efficient manner of packing multiple operands.

SUMMARY OF THE INVENTION

According to the invention, a template data transfer coprocessor is implemented to offload block data transfer operations from a mediaprocessor. The template data transfer coprocessor provides a versatile protocol for specifying various types of block data transfer operations.

According to one aspect of the invention, several types of data transfer templates are introduced: a uni-block template, program-guided template, an indirect template and queue-based template. These templates facilitate various types of data transfer flows in a mediaprocessor. According to an advantage of the invention, rather than computing and setting up lower-level data transfer parameters for each block transfer, parameterized templates provide an efficient and versatile mechanism for the programmer to easily design the needed data flow for a specific algorithm. For example, in 2D convolution and affine warping, the number of source code lines related to data flow programming was substantially reduced (e.g., to approximately ⅙ the number as required to achieve data transfer without the template).

According to another aspect of the invention, the uni-block and program-guided templates are used in block-based data transfers between the on-chip and off-chip memory of the mediaprocessor. According to an advantage of such templates, the input and output data blocks in the on-chip memory are able to be double buffered, so that the mediaprocessor functional unit(s) only need to access the data in on-chip memory for fast computation, while the data transfers from/to the slow external memory are hidden from the functional unit. For each block, the address and size are computed from the template by the template data transfer coprocessor. Therefore, data flow programming is simplified, and the computing burden on the CPU is reduced.

The uni-block template specifies blocks from the source memory space which can be overlapped. Consequently, the boundary blocks are padded or wrapped-around to prepare the necessary overlapping areas along the boundary.

The padding and wrapping are performed during actual data transfers. Therefore, the mediaprocessor computation is further reduced, and the programmer's burden is lowered due to the fact that these irregular data copy operations are handled automatically by the template data transfer coprocessor.

According to another aspect of the invention, the indirect data flow template allows for an efficient way to assemble data from random locations without creating any significant burden to the processor's computation engine.

According to another aspect of the invention, the queue-based data flow template facilitates a data transfer between a virtual queue and a physical queue. The virtual queue may be a circularly-accessed memory space and have an arbitrary size. The physical queue buffers the data and provides an operand stream for the computation engine. The template data transfer coprocessor streamlines the data from a 2D memory space into the operand buffer or dispatches the mediaprocessor results stored in the destination operand buffer to a 2D memory space. According to an advantage of such a template, the queue-based data flow eliminates many load/store instructions and relieves the pressure on the register file size. Moreover, the code scheduling becomes simpler without the long latency load/store instructions, and the amount of loop unrolling needed for high performance can be reduced, resulting in more compact code.

According to another aspect of the invention, the template data transfer coprocessor includes a 2D address generation unit (AGU) which has a built-in logic unit to allow a sequence of addresses to be generated uninterruptedly. These addresses correspond to a 2D block, which serves as the smallest data transfer unit. In that way, the central controller in the template data transfer coprocessor does not need to get involved in each address generation event, thus leaving more time for other template computation, e.g., locating the next transfer block, arbitrating among data flows, etc.

According to another aspect of the invention, the template data transfer coprocessor includes a template interpreter which serves as the main controller of the coprocessor. In one embodiment the interpreter employs an event-driven control mechanism to set up a template and compute block information for each template. According to an advantage of the interpreter the computation on each type of template is modularized. Therefore, a new template type may be easily added.

These and other aspects and advantages of the invention will be better understood by reference to the following detailed description taken in conjunction with the accompanying drawings.

DESCRIPTION OF SPECIFIC EMBODIMENTS

Overview

Figure 1:
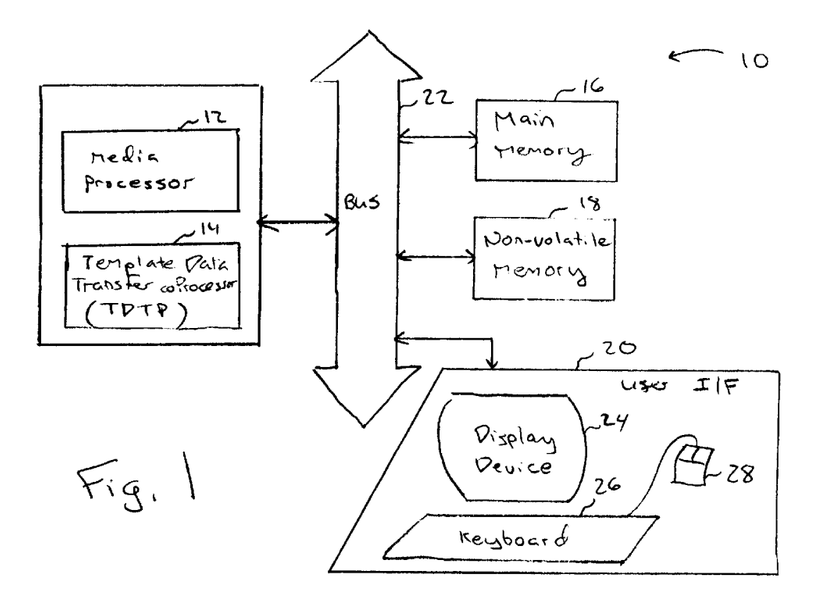
FIG. 1 is a block diagram of an image/video processing system having a mediaprocessor and template data transfer coprocessor according to an embodiment of this invention.

Referring to FIG. 1, a host system 10 for processing image or video data includes a mediaprocessor 12, a template data coprocessor 14, main memory 16, non-volatile memory 18, and a user interface 20 interconnected by one or more bus structures 22. The user interface 20 includes a display device 24, a keyboard 26 and a pointing/clicking device 28.

Figure 2:
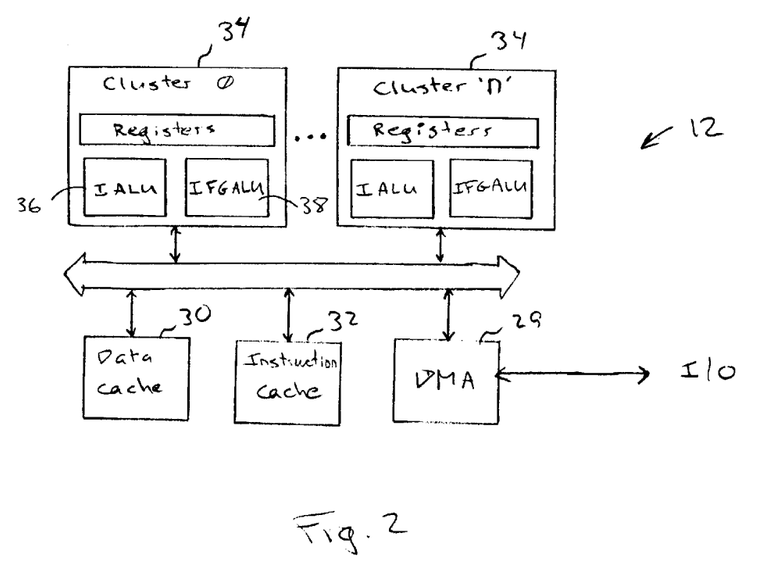
FIG. 2 is a block diagram of an exemplary mediaprocessor embodiment.

Referring to FIG. 2, in one embodiment the mediaprocessor 12 is formed by the media accelerated processor 1000 (MAP1000) manufactured by Hitachi Ltd. of Tokyo, Japan and Equator Technologies of Campbell, Calif. The MAP1000 includes a direct memory access (DMA) controller 29, on-chip memories (a data cache 30 and an instruction cache 32), and parallel execution units referred to as clusters 34. Each cluster 34 includes an integer arithmetic and logical unit 36 and an integer floating-point graphic arithmetic and logical unit 38. Also, each cluster 34 includes several general registers (e.g., 32-bit registers), several 1-bit predicate registers and multiple special purpose registers (e.g., 128-bit registers).

Various other mediaprocessor embodiments also may be implemented. Specifically, "Mediaprocessor" as used herein refers to a processor which exhibits on-chip parallelism for processing video or image data. Microprocessors and digital signal processors employ on-chip parallelism by a technique referred to as instruction-level parallelism. Instruction-level parallelism is where multiple operations are initiated in a single clock cycle. Two approaches to instruction-level parallelism are: the very long instruction word (VLIW) architecture and the superscalar architecture. In a VLIW architecture, the processor includes multiple independent functional units. Each long instruction contains an operation code for each functional unit. All functional units receive their operation code at substantially the same time. The functional units execute their assigned tasks concurrently. Superscalar architectures use special on-chip hardware to look through the instruction stream and find independent operations that can be executed at the same time to maximize parallelism.

Instruction-level parallelism is further extended in some systems using subword parallelism, in which an execution unit is partitioned into multiple smaller units. For example, processes implemented by a 64-bit arithmetic logic unit (ALU) in essence split the ALU logically into four smaller 16-bit ALU's. Specifically the data input to the ALU is a concatenation of four smaller subwords. The ALU output is a concatenation of the results on the four subwords. Such subword parallelism is incorporated into an architecture by providing what are referred to as "single instruction multiple data" (SIMD) instructions. Examples of an SIMD implementation of the mediaprocessor 12 are: Sun Microsystem's visual instruction set, Intel's multimedia extension, Hewlett-Packard's multimedia acceleration extensions-s, Digital Equipment Corporation's multimedia extensions, and Silicon Graphics, Inc.'s MIPS digital media extension. Instructions among these extensions treat a data word (e.g., 32 bit or 64 bit) as a set of multiple subwords (8, 16 or 32). Partitioned operations may be executed on each subword, obtaining 2-times, 4-times or 8-times performance improvement with minimal added hardware.

The template data transfer coprocessor (TDTP) 14 serves to handle various data flow patterns among the mediaprocessor's processing units (e.g clusters 34), the mediaprocessor's on-chip memory caches 30, 32 and external memory (e.g., system cache 16 and non-volatile memory 18). Minimal programming is implemented to achieve this data flow control by using templates.

Templates

A template is either of (i) a parameterized data structure, or (ii) a parameterized data structure with a defined parameter set. Various templates are used to handle the different types of data flows in a mediaprocessor. Four templates are described herein, including a uni-block template, a program-guided template, an indirect template and a queue-based template. Each of these template types is used for a group of similar data flows. The uni-block template describes a block by block data transfer between two memory location areas. All the data block parameters, e.g., addresses and sizes, are derived from the template. The program-guided template also defines a block-based data transfer, but the data block parameters are provided explicitly by the program. The uni-block template and program-guided template mainly are used to implement a double-buffering data flow, a desirable flow pattern for image/video processing. The indirect template allows mapping of discrete data elements (by indexing contiguous data) to a contiguous memory space. The indirect template effectively reduces the mediaprocessor's workload. The queue-based template specifies a data transfer between a memory space and a small physical stream queue of buffered operands for the mediaprocessor. In one embodiment the first item in each template is a code for identifying the type of template. A more detailed description of each template type follows.

Uni-block Template

Most image and video algorithms perform a computation on a single data frame or multiple data frames. Many algorithms may even implement data-level parallelism in which consecutive data can be computed independently. For example, processing may be partitioned, in which each partition works on blocks of image data that fit into the limited on-chip memory space. To facilitate data transfers for such processing a uni-block template is introduced. A uni-block template is used for describing a data transfer between on-chip and off-chip memory spaces with pre-defined transfer block dimensions and sizes.

Figure 3:
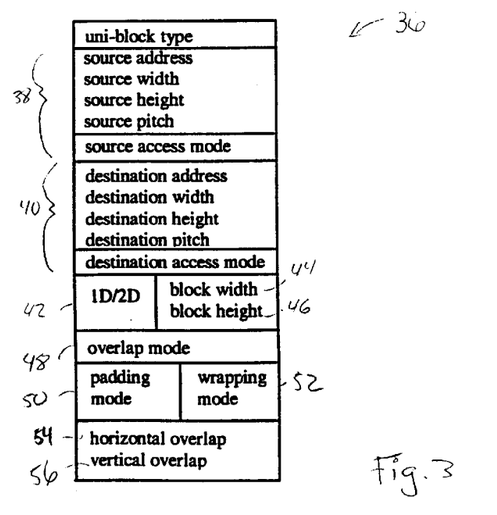
FIG. 3 is a diagram of a uni-block template for a data transfer implemented by the template data transfer coprocessor of FIG. 1.

Referring to FIG. 3, the uni-block template defines a source block and a destination block using source block parameters 38 and destination block parameters 40. Source block parameters 38 include a base address, a width, height, and pitch, and a source access mode. Similarly, the destination block parameters 40 include a base address, a width, height, and pitch, and a destination access mode. A dimension flag 42 (i.e., labeled 1D/2D flag), determines the dimension of the data transfer. Typically, a 2-dimensional (2D) block is defined with a block width 44 and a block height 46 parameter. When the flag 42 indicates 1-dimensional (1D), only the block width 44 is valid. For a 2-dimensional data transfer, an overlap mode parameter 48 is used which specifies whether the neighboring blocks in the source memory space are overlapping. When overlapping is set, either the padding mode parameter 50 or wrapping mode parameter 52 is valid to indicate whether padding or wrapping is used to handle the needed data at the overlapped boundary. Further, for each of the padding mode and wrapping mode a horizontal overlap parameter 54 value and a vertical overlap parameter 56 value are set. Pixel values are derived at the overlapped portion from the source block and the neighboring window of data.

Such padding and wrapping specificity is desired for more efficiently implementing certain algorithms. For example in an algorithm including a 2D convolution data blocks on the boundary need to be padded. In an algorithm including a wavelet transformation data blocks need to be wrapped around. In many algorithms where the block-based data flow programming is used, it is necessary to explicitly fetch the boundary pixels in addition to the bulk data. Handling such irregular data flows in the program tends to decrease the programmer's overall productivity and also make the source code harder to upgrade and maintain. Moreover, the degree of concurrency between computation and data flow is diminished. The uni-block template provides an efficient programming interface for specifying such capabilities.

Figure 4:
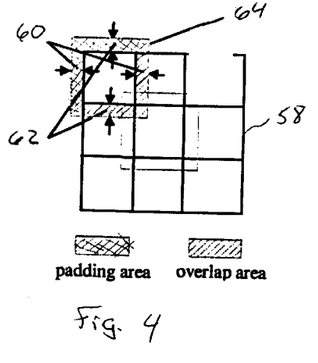
FIG. 4 is a diagram of a padding area for a source block among a set of image data blocks.

Referring to FIG. 4, nine blocks 58 of source data are depicted where padding is to be implemented. When neighboring pixels are used to compute a pixel, the symmetric neighboring window shown is used at the boundary. FIG. 4 shows the horizontal overlap 60 and vertical overlap 62 for a block 64. For a symmetrical neighboring window the padding is the same.

Figure 5:
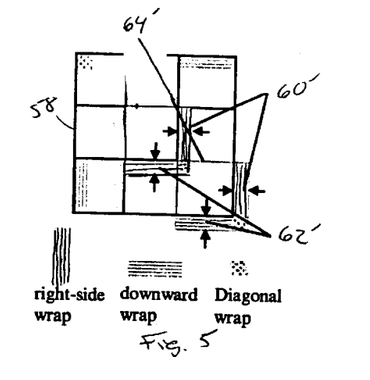
FIG. 5 is a diagram of data wrapping for a source block among a set of image data blocks.

Referring to FIG. 5, when wrapping mode is used, the overlap is not symmetrical. Instead, it is uni-directional. The padding mode can select between zero-padding and boundary extension, while the wrapping mode can further specify vertical (up or down) and horizontal (left or right) wrap. FIG. 5 shows the horizontal overlap 60' and vertical overlap 62' for a block 64'.

Figure 6A:
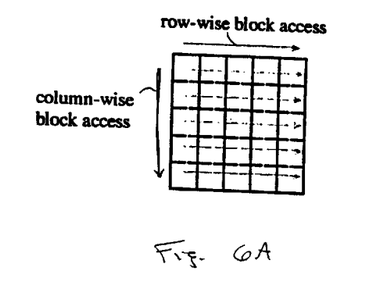
FIGS. 6A and 6B are diagrams showing accesses patterns for data blocks.
Figure 6B:
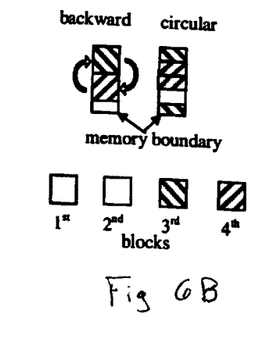

Added flexibility is achieved by using the source and destination access modes. The access mode determines whether the accessed data are targeted for the on-chip or off-chip memory. This is a key issue in double-buffering off-chip data in on-chip memory. Also, the access mode determines how the next data block in the source or destination memory space is addressed. Referring to FIG. 6a, the access mode determines whether the next block is row-wise or column-wise accessed in a 2D memory space. Referring to FIG. 6B, when the memory space boundary is reached, the access mode determines whether the backward block is accessed next or the memory space is circularly accessed.

The uni-block template 36 does not require that the source block and destination block be the same size. For example, when the template 36 defines an input data flow, the source memory space corresponds to the source image, while the destination memory space corresponds to the on-chip memory area that double-buffers the input data. The data transfer is finished when all the data in the larger source memory space has been transferred. The smaller on-chip memory space is reused by either backward or circular access mode as shown in FIG. 6B.

The template data transfer coprocessor 14 computes the data block addresses for each block transfer and adjusts the block size to match the source or destination memory space. Therefore, blocks at an image boundary can have different width and/or height values from those specified in the template. The run-time block information, e.g., address, width and height, is passed to the program. Thus, the program merely has to initialize the data flow templates, synchronize the block transfers, and process the blocks brought on-chip.

Program-guided Template

Figure 7:
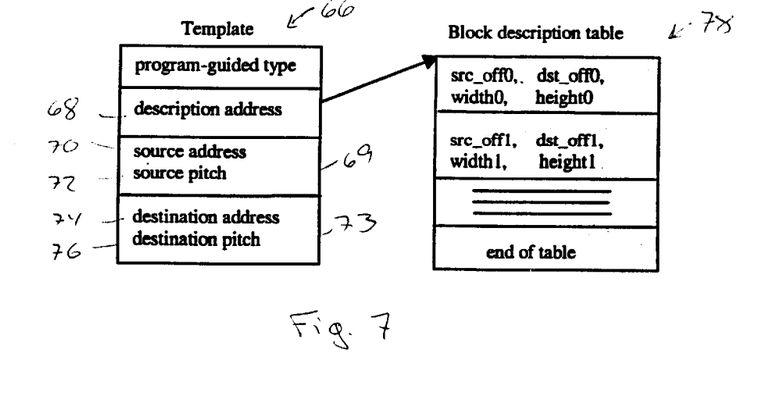
FIG. 7 is a diagram of a program-guided template for a data transfer implemented by the template data transfer coprocessor of FIG. 1.

Some algorithms require irregular block accesses, i.e., the address and size of each data block must be computed from the program. A program-guided template 66 as shown in FIG. 7 is used to facilitate such program-guided data transfers. The program-guided template 66 includes a description address parameter 68, a source field 69 and a destination field 73. The source field 69 includes a source address parameter 70 and a source pitch parameter 72. the destination field includes a destination address parameter 74 and a destination pitch parameter 76.

The description address parameter 68 stores an address which points to a block description table 78 that contains a source address offset, destination address offset, and size information of each block to be transferred. The source field 69 and destination field 73 store the base address and pitch values for the starting source block and destination block, respectively. By using different base addresses, the same block description table can be reused by different programs.

When transferring a block, the template data transfer coprocessor 14 fetches the block information from the block description table 78, calculates the source and destination block addresses, and starts the data transfer. The blocks defined in the block description table are transferred sequentially until the end of the description table is reached.

The program-guided template also is used for data transfers between the external memory 16, 18 and on-chip memory 30, 32 concurrently with processing computation, thus hiding the memory latency cycles from processor computation cycles. In particular, a program-guided data flow allows transfer of a sequence of randomly-located arbitrary-sized data blocks. Therefore, it gives more flexibility to the program in defining data flows. The overhead involved is that the template data transfer coprocesor 14 accesses the block description table for each block transfer.

Indirect Data Flow Template

Figure 8:
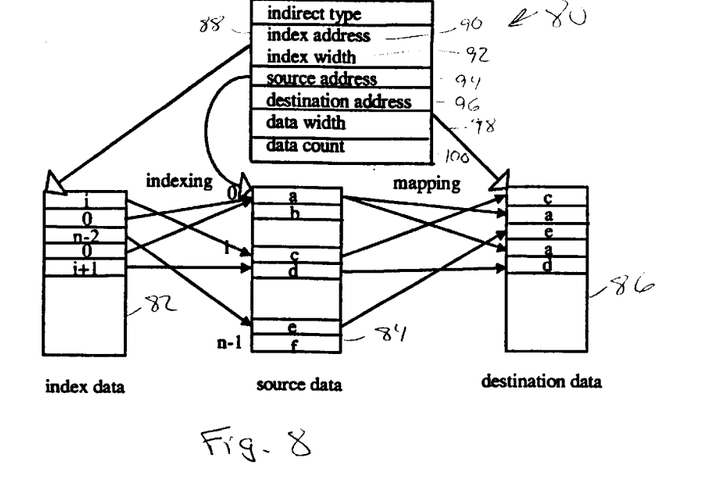
FIG. 8 is a diagram of an indirect template for a data transfer implemented by the template data transfer coprocessor of FIG. 1.

Referring to FIG. 8, a data transfer facilitated with an indirect data flow template 80 involves three memory spaces, i.e., index data area 82, source data area 84, and destination data area 86. The index data are used to compute the source data addresses. Therefore, access to the source data area 84 may be quite random. Accesses to the index data area 82 and destination data area 86 are expected to be sequential. The indirect data flow template 80 includes an index field 88 (e.g., index address 90 and index width 92), source data address parameter 94 and a destination data address parameter 96. It also specifies the data width 98 and the data count 100. The index width parameter 92 allows various formats of data, e.g., 8, 16, or 32 bits, to be used as indices. The template data transfer coprocessor 14 references the index data 82 in a sequential order, adds the currently accessed index data value to the corresponding source address parameter value 94, and uses the resulting address in accessing the source data area 84. The accessed source data are written to the destination area 86 sequentially. The number of transferred data items and each item's data width are determined by the count parameter 100 and width parameter 98. In this way, data from random memory locations can be packed. Indirect data flows are desirable for algorithms where a lookup table is used, e.g., geometric transform and grayscale mapping.

Because an indirect data transfers is used to pack or unpack data through data flow and to alleviate the processor computation of addresses, the speed for such transfer as achieved using the TDTP 14 preferably is comparable to that performed by the mediaprocessor clusters 34. However, to finish moving a destination data element requires three memory accesses, i.e., one read from index area 82, one read from source area 84, and one write to destination area 86, which slows down when off-chip memory accesses are involved. To avoid this potential bottleneck, the indirect data flow in some embodiments is limited to handling on-chip data, which can be prefetched through block-based data flows discussed in the previous section.

Queue-based Data Flow

Stream queues efficiently provide a constant flow of operands to a computation engine, thus relieving the pressure on registers. A queue is implemented either by hardware, e.g., using FIFO (first-in-first-out) memory, or by software, e.g., using a regular memory space. In one embodiment the template data transfer coprocessor uses hardware queues to buffer the necessary operands for the computation engine. In another embodiment a virtual queue is defined as a memory space that is circularly addressed by the template data transfer coprocessor. In still another embodiment a logical queue that is visible to the programmer is defined as the combination of a physical queue and its associated virtual queue. The template data transfer coprocessor 14 controls the data transfers between the virtual queue and physical queue, such that the logical queue has the depth comparable to the virtual queue. Because the physical queue is only used to buffer data, it can be rather small as long as it can handle the fluctuation of data transfer rates.

Figure 9:
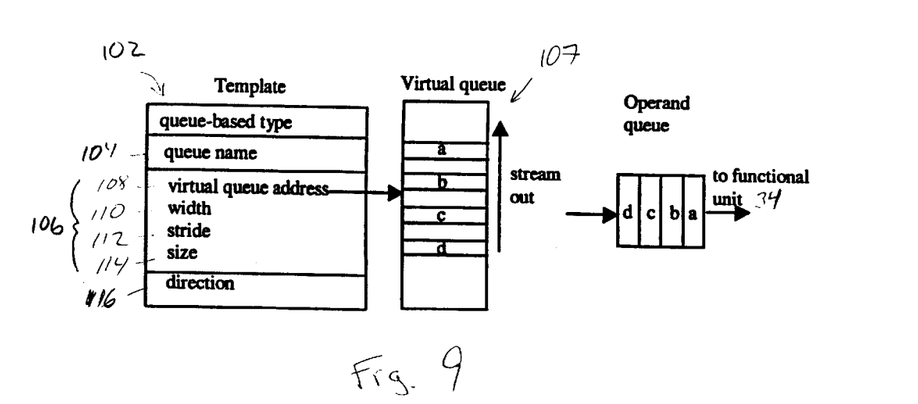
FIG. 9 is a diagram of a queue-based template for a data transfer implemented by the template data transfer coprocessor of FIG. 1.

Conventionally, data stored in a queue is sequentially accessed. However, the TDTP 14 allows added flexibility by using a queue-based template. Referring to FIG. 9, a queue-based template 102 includes a parameter 104 to specify the physical queue name, and a field 106 of parameters to specify an associated virtual queue 107. The virtual queue parameters include a virtual queue address 108, width 110, stride 112, and size 114. Accesses to the virtual queue 107 have a constant stride, which allows non-sequential data in the memory space to be streamed into a queue. The TDTP 14 transfers data between the virtual and physical queues according to a value of a direction parameter 116. The direction determines whether the queue is used as source or destination in the cluster 34 functional unit. The virtual queue memory space is circularly addressed and can be associated with several physical queues at a time. For example, the same virtual queue can be associated with a source operand queue and a destination operand queue. While the functional unit consumes the source queue data in the memory space, it also fills the destination queue memory space with the result.

The queue-based data transfer is controlled by the physical queue status. For a source operand queue, the transfer from on-chip memory to the operand buffer is stopped when the physical queue is full. For a destination operand queue, the transfer from the operand buffer to on-chip memory is stopped when the physical queue is empty.

Template Data Transfer Coprocessor Architecture

Figure 10:
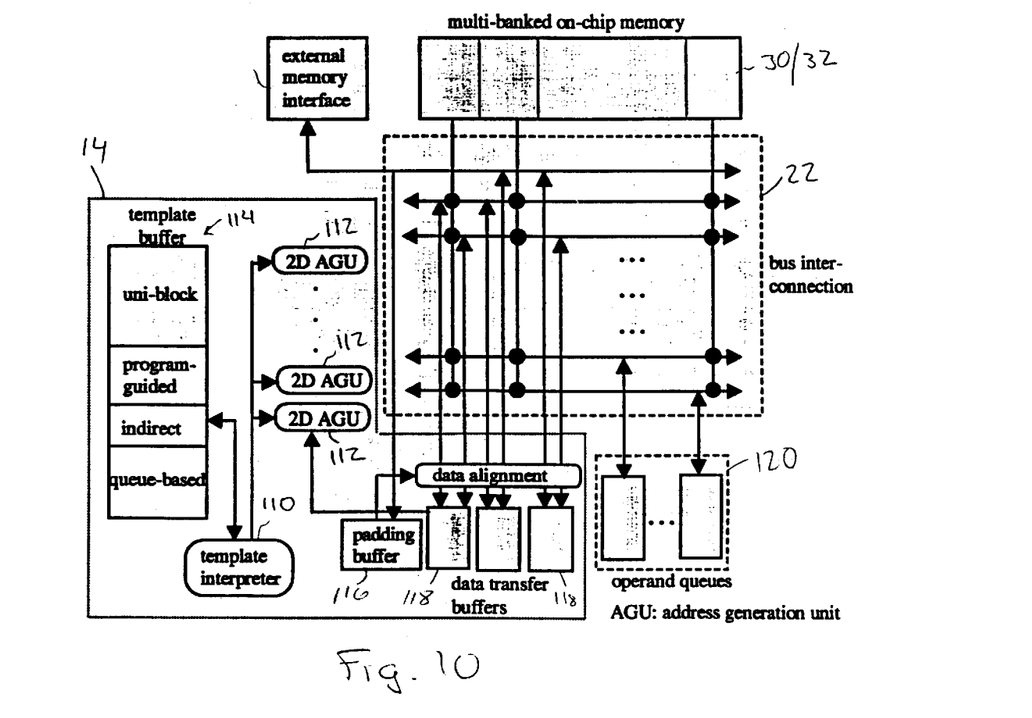
FIG. 10 is a block diagram of the template data transfer coprocessor of FIG. 1 according to an embodiment of this invention.

Referring to FIG. 10, in one embodiment the template data transfer coprocessor 14 includes a template interpreter 110, a collection of 2D address generation units (AGU) 112, a template buffer 114, a padding buffer 116 and data transfer buffers 118. The template buffer 114 includes static data flow information, such as template parameters set by an application program using the TDTP for one or more of the templates types 36, 78, 80, 107. The template buffer 114 also includes dynamic data flow information, such as the block address computed at run time.

The template interpreter 110 maintains a list of active template entries and computes run-time data transfer parameters for each active template. For block-based templates, i.e., uni-block and program-guided templates 36, 78, the transfer parameters of each block are computed synchronously with the program.

Each 2D AGU 112 accepts the 2D block information and generates a sequence of addresses for that block, which are used to drive the on-chip buses for data transfers. The number of 2D AGUs 112 is determined by the number of on-chip data buses that are connected to external memory 16, 18 and on-chip memory 30, 32. Multi-banked on-chip memory allows multiple data flows to proceed concurrently with minimal conflict.

Different template types may use a different set of 2D AGUs 112 since the 2D AGUs are associated with distinct data buses. For example, a queue-based template 107 uses a set of 2D AGUs 112 that are tied to data buses 22 that connect the on-chip memory 30, 32 and the operand queues 120. Multiple data flows can share the same AGU 112. When an AGU becomes available, the template interpreter 112 selects a block from the active templates that can use this AGU. This selection is performed on a round-robin basis. However, alternative selection rules can be enforced by using a priority parameter in the template.

Each template defines source and destination memory spaces, and data are transferred from the source memory and aligned (if necessary) before being stored into data transfer buffers 118. The number of data transfer buffers 118 determines the maximum number of concurrent data flows among external memory 16, 18 and on-chip memory 30, 32. The data in the transfer buffer 118 are also aligned (if necessary) before being transferred to the destination memory.

In addition, two special cases are described further. First, for the indirect template 80 the source data addresses are computed by adding index data to a source base address stored in source address parameter 94 (see FIG. 8). The associated 2D AGUs 112 quickly perform these additions by taking their operands directly from the on-chip memory or an operand queue that stores the index data. Second, to implement a padding and wrapping data flow, the boundary pixels are to be loaded into the TDTP 14. These pixels are stored in the padding buffer 116 and synchronously inserted into the data alignment unit with other data.

Figure 11:
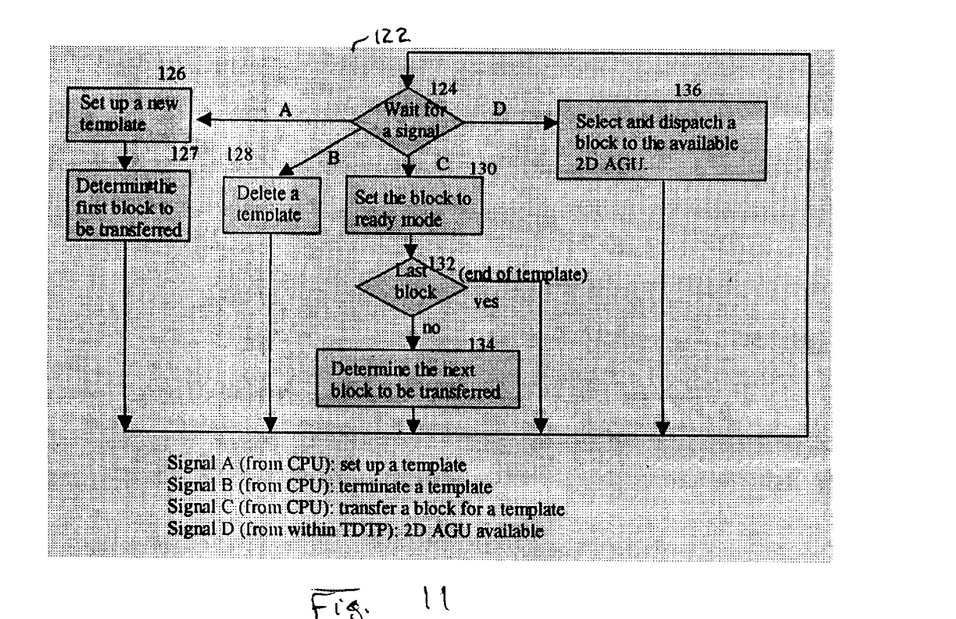
FIG. 11 is a flow chart of processing situations for the template interpreter of FIG. 10.

The template interpreter 110 controls data transfers and responds to signals from the mediaprocessor clusters 34 and AGUs 112. Referring to FIG. 11, a control flow 122 of the template interpreter 110 is shown. The template interpreter 110 waits at step 124 for a cluster 34 signal or a next available 2D AGU 112. One of four potential actions occurs depending on the signal received. For a cluster signal 'A', the interpreter initializes a new template at step 126. To do so, the interpreter 110 calls an appropriate template setup module according to the template type, and determines at step 127 the first block to be transferred. For a cluster signal 'B', the interpreter 110 terminates a template transfer at step 128 by deleting the template. For a cluster signal 'C' to perform a block transfer for a template, the interpreter sets the current block to a ready mode at step 130. At step 132, the interpreter tests if the last block has been reached. If not, the next block to be transferred is determined at step 134. When there are no more blocks specified in the template, the interpreter 110 signals the cluster 34 (by setting a flag that is polled by the cluster), indicating the completion of the template.

The fourth possible action is generated within the template data transfer coprocessor 14 at one of the AGUs 112. When a 2D AGU unit 112 becomes available, the AGU generates a signal 'D' to the interpreter 110. The interpreter 110 then selects a template and dispatches the ready block to the AGU unit at step 136. The 2D AGU also signals the interpreter when each block transfer has been completed.

The following examples illustrate the programming interface of template data transfers. In the first example, the function creates two block-based data flows by using set_uniblock routines (lines 1–2), one for input data and the other for output data. The set_uniblock routine requests the TDTP 14 to allocate a template, copies the parameters to the template buffer 114 and returns a handler to that template. The data flow is initiated by the transfer routine (lines 3, 6, and 10). Each call to the transfer routine transfers a block of data from the source memory to the destination memory. When all the data specified in the template have been transferred, further transfer is nullified.

The wait routine (lines 5 and 9) waits for the block transfer to be completed by polling the ready signal associated with the template. When the template is created, its ready signal is automatically set. TDTP resets the ready signal when it starts to transfer a block. The ready signal is set when the block transfer is completed. The tight loop call receives the address and size information about the input and output data blocks from the common data structure between the cluster 34 and TDTP 14. While the tight loop is executed on the cluster 34, the next input data block and the previous output data block are transferred by the TDTP 14. When all the data have been transferred for a template, the TDTP 14 sets the template finish signal, which is also used for loop control in the program.

The delete routine (lines 11–12) terminates the template by invalidating the associated template buffer. As shown in example 1, the TDTP 14 provides a set of efficient and simple programming interfaces to the application programs. In particular, the details of a data flow are hidden in the TDTP 14 by choosing appropriate template parameters.

EXAMPLE 1

UniBlock Template Transfer

```
Function( ) {
    input_comm = set_uniblock                              /*----- line 1 -----*
    (input data flow template parameters);
    output_comm = set_uniblock                             /*------ line 2 ------*/
    (output data flow template parameters);
    transfer(input_comm);                                  /*------ line 3 ------*/
    while(output_comm.not finished) {                      /*------ line 4 ------*/
        wait(input_comm);                                  /*------ line 5 ------*/
        input_block = get_dst                              /*------ line 6 ------*/
        (input_comm);
        transfer(input_comm);                              /*------ line 6 ------*/
        output_block = get_nextsrc(output_comm);           /*------ line 7 ------*/
        if(input_comm.not finished)
            function_tight_loop                            /*------ line 8 ------*/
            (input_block, output_block, . . . );
        wait(output_comm);                                 /*------ line 9 ------*/
        transfer(output_comm);                             /*------ line 10 ------*/
    }
    delete(input_comm);                                    /*------ line 11 ------*/
    delete(output_comm);                                   /*------ line 12 ----*/
}
```

Because a program-guided template can be used in double-buffering the data blocks in addition to the uni-block template, its programming interface is similar to that of example 1, except that the template is set by set_guided routines and a block description table is established in on-chip memory for the guided template before activating the data flow.

The second example illustrates the programming interface for an indirect data flow. The indirect data flow is created by the set_indirect routine (line 1), which requests the TDTP 14 to allocate an indirect template in the template buffer 114 and then transfers the parameters to the allocated template. The routine also returns a handler, by which the program can access the status information about the template. The indirect data transfer is started by using the transfer routine (line 2) followed by other tasks (line 3). At some point, the program waits for the indirect data transfer to be completed and then compute on the transferred data. The delete terminates the template.

EXAMPLE 2

Indirect Template Data Transfer

```
Function( ){
    indirect_comm = set_indirect(parameter list)   /*------ line 1 -----*
    transfer(indirect_comm);                       /*------ line 2 -----*
    ......                                         /*------ line 3 -----*
    wait(indirect_comm);                           /*------ line 4 -----*
    ......                                         /*------ line 5 -----*
    delete(indirect_comm);                         /*------ line 6 -----*
}
```

Example 3 shows the queue-based data flow interface. As in the block-based and indirect data flows, the set_voq (line 1) routine is used to create a template, and the transfer routine (line 2) is used to start the data transfer. However, the program starts using the queue right after the transfer routine without waiting for the transfer to be completed.

EXAMPLE 3

Queue-Based Template Transfer

```
Function( ) {
    queue_comm = set_voq(parameter list);   /*------ line 1 ------*
    transfer(queue_comm);                   /*------ line 2 -----*
    ......                                  /*------ line 3 -----*
    delete(queue_comm);                     /*------ line 4 -----*
}
```

Meritorious and Advantageous Effects

One advantage of the parameterized templates is that such templates are an efficient and versatile mechanism for the programmer to easily design a needed data flow for a specific algorithm, instead of computing and setting up lower-level data transfer parameters for each block transfer.

An advantage of a uni-block template is that the input and output data blocks in the on-chip memory are able to be double buffered, so that the mediaprocessor functional unit (s) only need to access the data in on-chip memory for fast computation, while the data transfers from/to the slow external memory are hidden from the functional unit. Also, for each block, the address and size are computed from the template by the template data transfer coprocessor. Therefore, data flow programming is simplified, and the computing burden on the CPU is reduced. Another advantage is that the uni-block template specifies blocks from the source memory space which are to be overlapped. Consequently, the boundary blocks are padded or wrapped-around to prepare the necessary overlapping areas along the boundary.

The padding and wrapping are performed during actual data transfers. Therefore, the mediaprocessor computation is further reduced, and the programmer's burden is lowered due to the fact that these irregular data copy operations are handled automatically by the template data transfer coprocessor.

An advantage of the indirect template is that it provides an efficient way to assemble data from random locations without creating any significant burden to the processor's computation engine.

An advantage of a queue-based data flow template is that it facilitates a data transfer between a virtual queue and a physical queue. The queue-based data flow eliminates load/store instructions and relieves the pressure on the register file size. Moreover, the code scheduling becomes simpler without the long latency load/store instructions, and the amount of loop unrolling needed for high performance can be reduced, resulting in more compact code.

Although preferred embodiments of the invention have been illustrated and described, various alternatives, modifications and equivalents may be used. Therefore, the foregoing description should not be taken as limiting the scope of the inventions which are defined by the appended claims.

What is claimed is:

1. A template data transfer coprocessor apparatus for handling data transfers to load and unload data for access by a mediaprocessor, the coprocessor apparatus comprising:
    a template buffer which concurrently stores a plurality of data transfer templates, each one of said plurality of data transfer templates comprising a set of parameters which define a corresponding data transfer operation, the set of parameters comprising a template type parameter, which identifies a template type from among a plurality of possible template types;
    a template interpreter which reads a template among the plurality of data transfer templates stored in the template buffer, determines a template type of the read template, sets up a data transfer according to the template type and tracks the corresponding data transfer operation for said read template;
    a plurality of address generating units, each of which is associated with a distinct bus, wherein a different set of said address generating units are used for a different one of the template types and each of said address generating units generates a set of addresses to be accessed for the read template based on information received from the template interpreter; and
    a data transfer buffer which receives data to be transferred from a source to a destination;
    wherein the coprocessor apparatus provides a plurality of image data blocks to the mediaprocessor for executing an image processing algorithm at the mediaprocessor.

2. The apparatus of claim 1, in which the set of parameters for a given one of said plurality of data transfer templates stored in the template buffer comprises static data flow information set during a compilation and dynamic data flow information computed at run time, and wherein the template interpreter derives the dynamic data flow information during run time.

3. The apparatus of claim 1, in which at least one of said plurality of data transfer templates facilitates a block data transfer and comprises parameters from which a block size of the block data transfer can be derived and from which source and destination addresses for the block data transfer can be derived.

4. The apparatus of claim 3, in which said at least one of said plurality of data transfer templates comprises source block parameters and destination block parameters, and an indication of whether the block transfer is for a one-dimensional block of data or a two-dimensional block of data.

5. The apparatus of claim 3 in which said at least one of said plurality of data transfer templates which facilitates a block data transfer further comprises an indication of an overlap mode and a manner of modifying boundary data.

6. The apparatus of claim 1, in which at least one of said plurality of data transfer templates facilitates a program-guided block data transfer and comprises source parameters and destination parameters for facilitating a transfer of a sequence of randomly-located, arbitrary sized data blocks.

7. The apparatus of claim 1, in which at least one of said plurality of data transfer templates facilitates an indirect data transfer and comprises an index starting address parameter, a source address parameter and a destination address parameter.

8. The apparatus of claim 1, in which at least one of said plurality of data transfer templates facilitates a queue-based data transfer for facilitating a data transfer between a physical queue and a virtual queue.

9. The apparatus of claim 1, in combination with external memory and a media processor having on-chip memory, wherein the template data transfer coprocessor facilitates transfer of data between the external memory and the on-chip memory.

10. A method for facilitating a data transfer between an on-chip memory of a mediaprocessor and off-chip memory, comprising the steps of:

compiling code including a plurality of data transfer templates, each one of the plurality of data transfer templates including a plurality of parameters which facilitate a data transfer between on-chip memory and off-chip memory, said plurality of parameters comprising a template type parameter which identifies a type of template among a range of template types;

executing an image processing algorithm at a mediaprocessor for a plurality of image data blocks;

loading at least one of said plurality of data transfer templates into a template buffer;

determining the type of template of a loaded template based on the template type parameter of said loaded template;

selecting a set of address generating units according to the determined template type from among a plurality of address generating units, wherein each of said plurality of address generating units is associated with a distinct bus, and allowing each of said selected set of address generating units to generate a set of addresses to be accessed for the loaded template; and facilitating transfer of data between on-chip memory and off-chip memory using the generated set of addresses with a coprocessor according to the determined template type which accesses said loaded template to provide said plurality of image data blocks to the mediaprocessor for said executing of said image processing algorithm.

11. The method of claim 10, in which said at least one of said plurality of data transfer templates facilitates a block data transfer and comprises parameters from which a block size of the block data transfer can be derived and from which source and destination addresses for the block data transfer can be derived.

12. The method of claim 10, in which said at least one of said plurality of data transfer templates comprises source block parameters and destination block parameters, and an indication of whether the block transfer is for a one-dimensional block of data or a two-dimensional block of data.

13. The method of claim 12, in which said at least one of said plurality of data transfer templates further comprises an indication of an overlap mode and a manner of modifying boundary data.

14. The method of claim 10, in which said at least one of said plurality of data transfer templates facilitates a program-guided block data transfer and comprises source parameters and destination parameters for facilitating a transfer of a sequence of randomly-located, arbitrary sized data blocks.

15. The method of claim 10, in which said at least one of said plurality of data transfer templates facilitates an indirect data transfer and comprises an index starting address parameter, a source address parameter and a destination address parameter.

16. The method of claim 10, in which said at least one of said plurality of data transfer templates facilitates a queue-based data transfer for facilitating a data transfer between a physical queue and a virtual queue.

17. The method of claim 10, in which said plurality of parameters are determined at compilation time.

18. The method of claim 10, in which at least one of said plurality of parameters is defined at run time by the coprocessor.

19. The method of claim 10, in which said step of facilitating comprises providing said plurality of image data blocks to the mediaprocessor packaged as operands having subword partitions, wherein a subword corresponds to one data item of an image data block of said plurality of data blocks.

20. The method of claim 10, in which the step of determining comprises:

distinguishing the type of template from among at least two template types among the group of types comprising: a uni-block template type, a program guided template type, an indirect data flow template type, and a queue based template type.

21. A system comprising:

a mediaprocessor for processing media data; and a template data coprocessor, comprising:

a template buffer which stores one or more templates, each one of said one or more templates comprising a set of parameters which define a corresponding data transfer operation, the set of parameters comprising a first parameter which identifies a template type, the template type identifying the type of data transfer operation to be implemented by said one template;

a template interpreter which reads a current template stored in the template buffer, determines the template type according to said first parameter of said current template, sets up a data transfer according to the template type and tracks the corresponding data transfer operation for said current template;

a plurality of address generating units, each of which is associated with a distinct bus, wherein a different set of said address generating units are used for a different one of the template types, and each of said address generating units generates a set of addresses to be accessed for the current template based on information received from the template interpreter; and a data transfer buffer which receives data to be transferred from a source to a destination;

wherein the template data coprocessor provides a plurality of image data blocks to the mediaprocessor for executing an image processing algorithm at the mediaprocessor.

22. The system of claim 21, in which the template type identifies the type of data transfer operation from among a group of data transfer types including a uni-block transfer, a program guided transfer, an indirect data flow transfer, and a queue based transfer.

23. The system of claim 21, in which the template interpreter determines the template type by distinguishing the read template type from among at least two templates types from the group of template types including a uni-block template type, a program guided template type, an indirect data flow template type, and a queue based template type.

24. The system of claim 21, in which the template buffer concurrently stores a plurality of templates received from memory.

25. The system of claim 24, in which the plurality of templates stored in the template buffer include at least two different types of templates from the group of template types including a uni-block template type, a program guided template type, an indirect data flow template type, and a queue based template type.

26. The apparatus of claim 1, in which the plurality of data transfer templates stored in the template buffer include at least two different types of templates from the group of template types including a uni-block template type, a program guided template type, an indirect data flow template type, and a queue based template type.

27. The method of claim 10, in which the step of loading comprises loading a plurality of data transfer templates into the template buffer, said plurality of loaded templates comprising at least two different types of templates from the group of template types including a uni-block template type, a program guided template type, an indirect data flow template type, and a queue based template type.

* * * * *